US012663778B1

(12) United States Patent　　　　(10) Patent No.:　US 12,663,778 B1

Jackson et al.　　　　　　　　　　　(45) Date of Patent:　Jun. 23, 2026

(54) SYSTEMS AND METHODS FOR GENERATING A TOOL PATH USING COMPUTER AIDED MANUFACTURING FOR MACHINING

(71) Applicant: CNC SOFTWARE, LLC, Tolland, CT (US)

(72) Inventors: Seth Jackson, Tolland, CT (US); Dylan Gondyke, Tolland, CT (US); Mike Johnson, Tolland, CT (US); Dave Conigliaro, Tolland, CT (US); Carlos Carbonera, Tolland, CT (US); Dustin Peirolo, Tolland, CT (US)

(73) Assignee: CNC Software, LLC, Tolland, CT (US)

( * ) Notice: Subject to any disclaimer, the term of this patent is extended or adjusted under 35 U.S.C. 154(b) by 0 days.

(21) Appl. No.: 19/251,917

(22) Filed: Jun. 27, 2025

(51) Int. Cl.
　　*G05B 19/402*　　(2006.01)
　　*G05B 19/18*　　　(2006.01)
　　*G05B 19/4069*　　(2006.01)

(52) U.S. Cl.
　　CPC ......... G05B 19/402 (2013.01); G05B 19/182 (2013.01); G05B 19/4069 (2013.01)

(58) Field of Classification Search
　　CPC . G05B 19/402; G05B 19/182; G05B 19/4069
　　USPC ........................................................ 700/56
　　See application file for complete search history.

(56) References Cited

U.S. PATENT DOCUMENTS

| | | | |
|---|---|---|---|
| 10,990,078 B2 * | 4/2021 | Kreidler ........... | G05B 19/41875 |
| 2001/0000805 A1 * | 5/2001 | Kadono ............. | G05B 19/4097 700/98 |
| 2011/0118866 A1 * | 5/2011 | Bandini ........... | G05B 19/40937 700/190 |
| 2013/0144425 A1 * | 6/2013 | Chu ................... | G05B 19/4097 700/184 |
| 2017/0308057 A1 * | 10/2017 | Kreidler ........... | G05B 19/41875 |
| 2018/0079043 A1 * | 3/2018 | Inoue ..................... | G05B 19/29 |
| 2020/0125068 A1 * | 4/2020 | Trounson, III .. | G05B 19/40938 |
| 2021/0341899 A1 * | 11/2021 | Garvey .............. | G05B 19/4183 |
| 2023/0055428 A1 * | 2/2023 | Nordell .............. | G05B 19/4097 |
| 2024/0027988 A1 * | 1/2024 | Saitou ................. | G05B 19/404 |

* cited by examiner

*Primary Examiner* — Md Azad

(74) *Attorney, Agent, or Firm* — Corinne R. Gorski

(57)　　　　　　ABSTRACT

A system of nodes generates machine instructions representing a tool path for a tool to manufacture an object from a workpiece material. The system includes a generator node, adapted to generate and transmit a raw pass packet. The raw pass packet includes a plurality of passes, each pass having a plurality of points, and each point detailing a location in space to be traversed by the tool to manufacture an object from the material. The system includes a filter node, that receives, modifies and transmits the raw pass packet. A processing node is adapted to receive the raw pass packet and convert it to another format. The nodes are arranged as a directed acyclic graph, each node being associated with an ordering number and each node only transmitting data to a node with a higher ordering number and only receiving data from a node with a lower ordering number.

14 Claims, 8 Drawing Sheets

100

Obtaining a model of an object to be manufactured — 802

Generating a raw tool path comprising a raw pass packet — 804

Adding tool axis control information — 806

Performing a de-gouging operation — 808

Providing linking information — 810

SYSTEMS AND METHODS FOR GENERATING A TOOL PATH USING COMPUTER AIDED MANUFACTURING FOR MACHINING

TECHNICAL FIELD

The present disclosure relates generally to methods and systems for generating a tool path, especially tool paths generated by CAM systems used for machining.

BACKGROUND

Today, tool path generation is a crucial part of manufacturing an article with subtractive manufacturing, also called machining. Subtractive manufacturing techniques are fundamental to the worldwide production of parts. Manufacturing processes based on subtractive techniques use different machines that are guided by machine code instructions, also known as tool path. The generation of tool path is automated to great extent through manufacturing techniques known as Computer Aided Manufacturing (CNC).

An article to be manufactured, also known as a part, is a three-dimensional object defined digitally and is called a Computer Aided Designed or CAD model.

The article to be manufactured is often represented as a three-dimensional model, which may be a Computer Aided Design, CAD, model. When the article is to be manufactured, a Computer Aided Manufacturing, CAM, software is used in order to generate a tool path for manufacturing the article from a workpiece material, also called stock, whereafter a machining system manufactures the article using one or multiple tools, which operate according to the tool path.

The time it takes to generate tool path using a CAM system directly impacts the cost of a part. Reducing the time to generate this tool path, thus, reduces the overall cost of the manufacturing process. In addition, improving the efficiency of a tool path leads to reductions in energy consumption as well as faster manufacturing cycles, and, thus, reduces the cost of the part.

Providing direct control on the tool path to the user can lead to further performance enhancements and quality improvements in the manufacturing of a part or manufacturing article, and, thus, providing editing tools to the user would lead to further reduction of costs. Furthermore, expertise and experience of a user on a particular CAM systems constrains the cost of the manufacturability of a part or machining article and its end quality It would be beneficial if the architecture of systems for creating tool paths could be improved in such a way that the system would be faster and that the tool paths would be easier to edit. It would also be beneficial to decrease the knowledge requirements of a user who creates tool paths, in order to enable more users to create their own tool paths according to their own preferences.

Consequently, there exists a need for improvement when it comes to methods and systems for tool path generation

SUMMARY

It is an object of the invention to address at least some of the problems and issues outlined above. It is an object of the invention to provide systems and methods which are able to produce tool paths in a faster, more flexible and more efficient way than what is known in the prior art. The systems and methods according to the present disclosure may further increase the control provided to a user, and decrease the knowledge requirements of a user.

According to a first aspect, a system of nodes for generating machine instructions representing a tool path to be used by a tool of a machine in order to manufacture an object from a workpiece material is provided. The system comprises a generator node, adapted to generate and transmit a raw pass packet, the raw pass packet comprising a plurality of passes, each pass comprising a plurality of points, each point detailing a location in space to be traversed by a tool in order to manufacture an object from a workpiece material. The system further comprises a filter node, adapted to receive, modify and transmit the raw pass packet. The system further comprises a processing node, adapted to receive the raw pass packet and convert it to another format. The generator, filter and processing nodes are arranged as a directed acyclic graph, such that each node is associated with an ordering number and wherein each node can only transmit data to a node with a higher ordering number and only receive data from a node with a lower ordering number.

According to some optional embodiments each node further comprises configuration data detailing the function of the corresponding node, wherein the configuration data for a node may be at least partly received by another node in the system with a lower ordering number.

According to some optional embodiments the system only comprises generator nodes, filter nodes, and processing nodes and no other types of nodes.

According to some optional embodiments, the system comprises three different types of filter nodes, a tool axis control node, which is a first type of filter node adapted to add tool axis control information to the raw pass packet, wherein the tool axis control information comprises a location and orientation of a tool that is to be used when manufacturing the object, a tip position of the tool in each point of each pass, and a surface normal for each point of each pass. The system further comprises a de-gouging node, which is a second type of filter node adapted to perform a de-gouging operation on the raw pass packet, wherein the de-gouging operation ensures that there are no collisions of the tool with anything other than the workpiece material from which the object is cut, and that there is no position in which the tool goes beyond a surface boundary of the object, for each point in the raw pass packet. The system further comprises a linking node, which is a third type of filter node adapted to add linking information to the raw pass packet, the linking information describing how to transition between an end point of one pass and the starting point of the next pass, for all passes in the raw pass packet except for the last pass.

According to some optional embodiments, each node is adapted to only perform its specified function and no other operations. In other words, there is no additional data added to the RPP in addition to the data described as being added in any of the embodiments described herein.

According to some optional embodiments, each type of node except for the de-gouging node is adapted to use an altered version of the geometry of the object as input. By using an altered version of the geometry of the object the system may become more flexible and decrease the computational demand, by e.g. omitting complex details from operations in which they do not matter or by decreasing the level of detail if it can be done without adverse effects to the final result. In some embodiments, a less detailed version may be used in earlier nodes in the system and a more detailed version may be used at later nodes in the system.

According to some optional embodiments, at least one of the nodes is a super node comprising multiple nodes.

According to some optional embodiments each node is adapted to only begin its operation after all directly preceding nodes have finished their operation.

According to some optional embodiments, the system further comprises a type of node called a logic node, wherein the logic node is a filter node but which is exempt from the requirement to wait for all nodes with a lower ordering number to finish their operation before it starts its operation.

According to a second aspect, a method for generating machine instructions representing a tool path to be used by a tool of a machine in order to manufacture an object from a workpiece material is provided. The method comprises obtaining a model of the object to be manufactured and generating a raw tool path comprising a raw pass packet, the raw pass packet comprising a plurality of passes, each pass comprising a plurality of points, each point detailing a location in space to be traversed by a tool in order to manufacture an object from a workpiece material. The method further comprises adding tool axis control information to the raw pass packet, the tool axis control information comprising, for each point in the raw tool path, a surface normal, a tip position of the tool and an orientation of the tool, thus obtaining Offset Cutter Location Data. The method further comprises performing a de-gouging operation on the Offset Cutter Location Data in order to ensure that there are no collisions of the tool with anything other than the workpiece material from which the object is cut, and that there is no position in which the tool goes beyond a surface boundary of the object, for each point in the raw pass packet, thus obtaining a Safe Offset Cutter Location Data. The method further comprises providing linking information about how to transition between start points and end points of each pass except for the last pass of the Safe Offset Cutter Location Data, thus obtaining a tool path.

According to other aspects, a computer program and carrier containing the computer program are also provided.

Further possible features and benefits of this solution will become apparent from the detailed description below.

DETAILED DESCRIPTION

Figure 1:
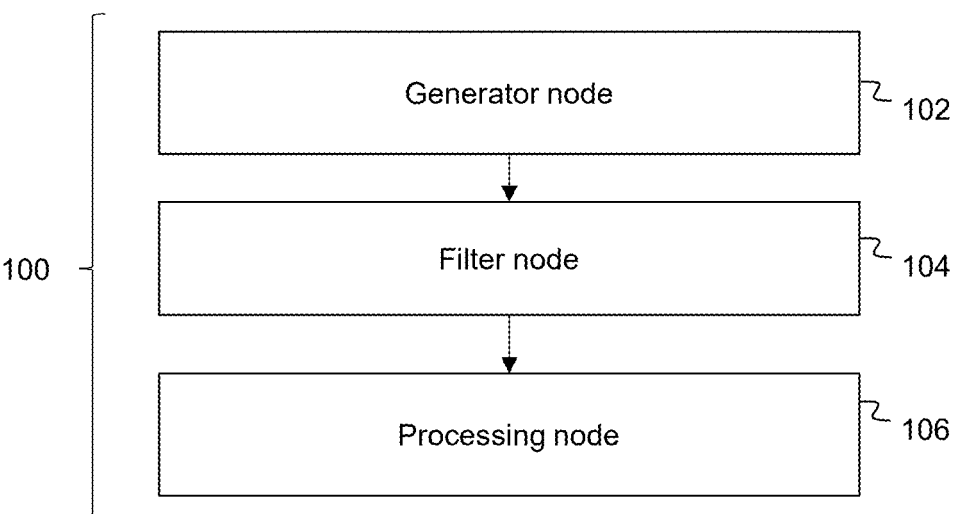
FIG. 1 schematically shows a system of nodes according to one embodiment.

The present solution relates to methods and systems for generating a tool path to be run in a machine, such as a CNC machine, in order to machine an object. In some embodiments, the tool path to be generated is a finishing tool path intended to be used on a near finished version of the object in order to achieve a finished version of the object.

Traditional architectures of CNC tool path software break the problem of tool path generation into large chunks of code that perform a plurality of highly interdependent tasks to compute a specific type of toolpath. Some examples of tool path types include contour, constant scallop, parallel plane, dynamic toolpath for roughing, etc. The order in which these tasks are performed are generally fixed in a strict order.

The novel approach disclosed herein breaks down the task of generating a tool path into a collection of independent single tasks, performed in specific nodes, that can be combined in order to generate any type of tool path. Each of these nodes can interlock with any other, with a few exceptions depending on the embodiment, and can be combined in a multitude of ways.

The methods and systems disclosed herein result in a faster and more efficient way of generating a tool path. In some embodiments, the methods and systems may enable editing a part of the tool path, without having to redo the entire tool path. The methods and systems are generally suitable for use by users without much prior machining and/or programming knowledge.

According to a first aspect of the present disclosure, a system of nodes, typically software implemented nodes, for generating a tool path is disclosed. The system of nodes builds upon the realization that by having three different types of nodes, ordering the nodes as a directed acyclic graph, and requiring the input and/or output data to adhere to certain predefined rules, a simpler, faster and more efficient system may be achieved than what is currently available.

The type of data that is required as input and/or is outputted by the nodes according to the present disclosure is called a raw pass packet throughout this disclosure. A raw pass packet is defined as a packet of data comprising a plurality of passes, wherein each pass comprises a plurality of points, wherein each point represents a location in space that is to be traversed by a tool in order to machine an object. Points in a raw pass packet may represent both locations that are to be contacted, i.e. where the tool is to engage with the workpiece material, and locations in which the tool travels without contacting the workpiece material. The points in the raw pass packets may also contain sequence and/or ordering information detailing in which order they are to be contacted.

The system of nodes according to the present disclosure comprises three different types of nodes. A first type of node called a generator node, adapted to receive any input and generate a raw pass packet based on that input. In practice, the generator node uses an input containing or which can be used to obtain the geometry of the part to be manufactured, which may e.g. be a 3D model of the part to be manufactured.

The raw pass packet is then used as input to a second type of node, called a filter node, which has the purpose of modifying the raw pass packet in different ways, depending on factors such as user preference and information about the machining system used to manufacture the object. The filter node also outputs the raw pass packet, after it has been modified (or in some cases without modifying it), which is used as input for the third type of node, which is called a processing node. The processing node has the purpose of modifying the raw pass packet into a different format which can be used by different parts of the machining system, such as NC code or scoring data.

A system may have any number of nodes, and any number of each type of node. In some embodiments, each node must be one of the three types and there are no other types of nodes used in the system, and a node cannot belong to more than one type. However, it is possible to have different variations of nodes of the same type, which will be described in more detail throughout this disclosure. Which category a node belongs to is determined by its required input and output, but the function of the node may vary within the bounds of those requirements.

According to a second aspect of the present disclosure, a method for generating a tool path is disclosed. The method may be performed by a system of nodes according to different embodiments of the first aspect. The method comprises a series of steps where specific types of data are added and/or generated in a certain order.

Briefly described, the method comprises obtaining a model of the object to be manufactured and generating a raw pass packet based on the model, then adding information about the tool to be used and restrictions associated with that tool, then de-gouging in order to ensure that there are no tool positions resulting in a collision or undesirable gouging of the object, and finally adding linking information in order to tie different passes together.

A relevant insight for methods according to the present disclosure is that by dividing the method into a plurality of individual steps, without mixing them together, the calculation of the entire tool path and especially the editability of the tool path, can be improved compared with prior art.

Throughout this disclosure, the expression "geometry" of the object to be manufactured is used and is meant to denote both the actual geometry, i.e. the shape, size and dimensions of the object as well as anything from which the geometry can be obtained, including a 3D model of the object. The geometry of the object may in some embodiments be a required input for some, or each, of the nodes in the system.

Looking now at FIG. 1, a system 100 of nodes is shown. The system 100 may be adapted to perform a method according to the embodiments described above. The system 100 shown in FIG. 1, shows a general implementation of a system of nodes according to the present disclosure, which is used for creating a tool path.

The system 100 comprises a generator node 102, a filter node 104, and a processing node 106. The nodes are each associated with an ordering number and are structured as a directed acyclic graph, which entails that each node can only output its information to a later node, i.e. a node with a higher ordering number, in a sequence of ordering of nodes, and never to an earlier node, i.e. a node with a lower ordering number. From this follows that there can be no cycles or loops of data in the system of nodes, which is beneficial for a multitude of reasons. For example, this enables implementation of parallel processing of multiple nodes in a relatively simply way, it facilitates tracking errors occurring in the system, and it enables easier editing of parts of the tool path. In some embodiments, parallel processing occurs when two nodes receive their inputs at the same time. In some embodiments, parallel processing of two nodes can only occur if the nodes have the same ordering number.

In some embodiments, the filter node 104 is optional and the system only comprises one or multiple generator nodes and one or multiple processing nodes, wherein each generator node is directly connected to a processing node.

In FIG. 1, the generator node 102 is ordered before the filter node 104, and the filter node 104 is ordered before the processing node 106. In other words, the generator node 102 has a lower ordering number than the filter node 104, and the filter node 104 has a lower ordering number than the processing node 106.

From that follows that, in the arrangement of FIG. 1, the generator node 102 can send its data to the filter node 104 or to the processing node 106, the filter node 104 can send its data to the processing node 106 but not to the generator node 102, and the processing node 106 cannot send its data to either of the generator node 102 and filter node 104. However, the processing node 106 can send its data to other nodes or devices, not part of the presently disclosed system, such as a NC machine or a computer or program controlling a machining system.

The generator node 102 is adapted to take an input and generate output data adhering to predefined requirements. The input can in theory be anything, as long as the output contains the required type of data, which is referred to as a raw pass packet, RPP, in the present disclosure. In practice, the input to a generator node 102 is usually a 3D model containing the geometry of an object to be manufactured using a machining system.

The filter node 104 is adapted to only accept input data which adheres to the predetermined requirements, which in the present disclosure entails that it contains a raw pass packet. The filter node 104 is further adapted to output data that also adheres to the predetermined requirements, i.e. that it contains a raw pass packet.

The processing node 106 is adapted to only accept input data which adheres to the predetermined requirements, i.e. which contains a raw pass packet. The processing node 106 will then convert the input data into output data which is usable by another application or in another process. Most commonly, the processing node 106 will convert the data to G-code or NC code. Another common function of the processing node 106 is to convert the data to scores related to specific metrics of intrinsic or extrinsic quality, which may be used as basis for a decision related to the data, such as whether or not modify the data in another filter node before transmitting it to a processing node adapted to convert it into G-code or NC code.

In some embodiments, the raw pass packet may comprise other types of data in addition to the plurality of passes. In some embodiments, the raw pass packet may be limited to only include a plurality of passes when it is transmitted from the first generator node to the subsequent node. In some embodiments the raw pass packet is limited to only include a plurality of passes at all instances. Generally, as the raw pass packet is processed by more and more nodes in the system, additional information is added and/or the data in the RPP is altered, i.e. the position of one or multiple of the points in the passes contained in the RPP may be changed. In some embodiments, the filter node(s) may also add or delete points in the RPP.

The purpose of a filter node is often to adapt the RPP in order to achieve a certain goal or in order to fulfill certain criteria, and in such cases it is likely that the data in the RPP is altered when being processed by a filter node. It may also be the purpose of a filter node to add certain information the RPP in addition to the points representing the passes, as will be elaborated on later in this disclosure.

In some embodiments, the raw pass packet may further comprise a surface normal for each point. In some embodiments the raw pass packet may further comprise tool axis control information, which will be described more in detail later. In some embodiments, the raw pass packet may further comprise additional information, including but not limited to information about the deepest point of contact of the tool, the depth of each cut, or the distance to contact with the workpiece material in each point.

Each pass comprises a starting point and an end point, with intermediate points in between. The main difference between an end point and an intermediate point is that in an endpoint a tool transition, i.e. a movement of the tool in which it does not engage with any material, may or will be required in order to reach the next point on the tool path, which is a starting point for the next pass.

In some embodiments, the raw pass packet may further comprise additional data, such as an order in which the locations are to be contacted. In some embodiments, the raw pass packet may further comprise any, all or some of the following data: information related to gouging conditions, flags indicating active and inactive passes or points, feed rates, spindle speeds, linking strategies, and other types of data relevant for the tool path.

An inactive point is defined as a point which is not to be traversed by a tool when machining the object, and an active points is a point that is to be traversed by a tool when machining the object. By flagging points as inactive instead of removing them a later node in the system may remove or change the flags related to the points, for example change an inactive point to an active point.

Generally, a raw pass packet which is sent from the generator node 102 to the first filter node contains less detailed data than the final version of the corresponding or same raw pass packet which is sent from the last filter node to the processing node 106. The additional and/or more detailed data contained in the raw pass packet is added or modified by the filter node(s) in the system.

Thus, in other words, the generator node 102 is required to output a raw pass packet, the filter node 104 is required to both input and output a raw pass packet, and the processing node 106 is required to input a raw pass packet. This is shown in FIG. 2A-2C, which illustrates the concept.

Figure 2A:
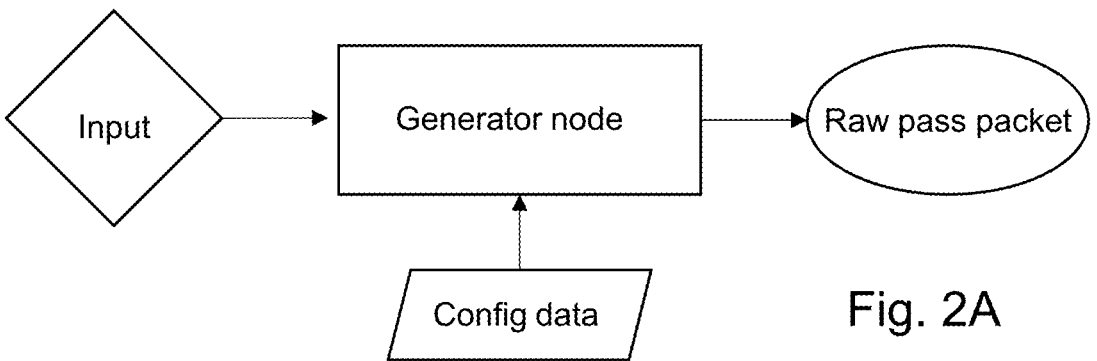
FIG. 2A schematically shows a data flow for a generator node.
Figure 2B:
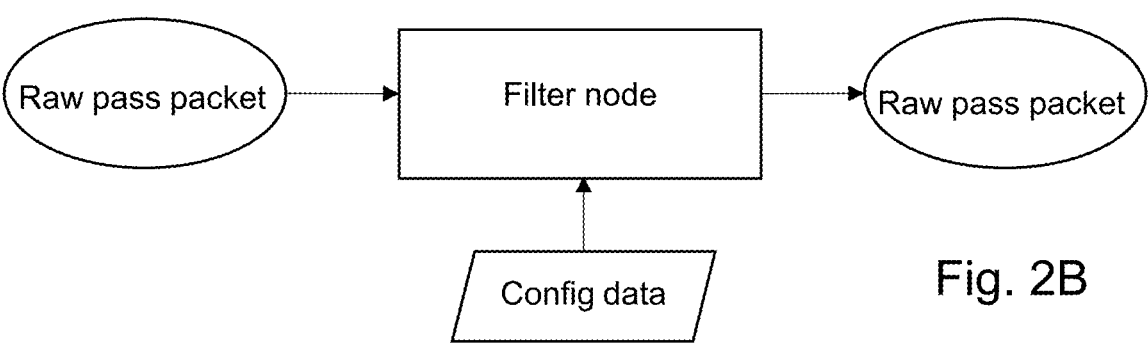
FIG. 2B schematically shows a data flow for a filter node.
Figure 2C:
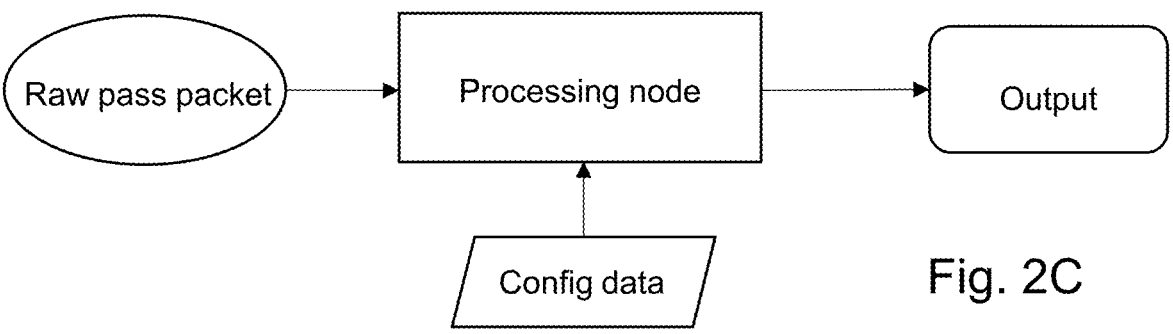
FIG. 2C schematically shows a data flow for a processing node.

According to some embodiments of the system, which is illustrated in FIGS. 2A-2C, each node contains configuration data. The configuration data is different from the raw pass packet in that it describes and determines the behavior of the node itself, and is not required to come from a preceding node in the system, although in some embodiments it may be at least partly received by a preceding node.

Before a node executes its processing of a raw pass packet, its configuration data needs to be configured. In some embodiments, the configuration data is determined based on the type of node, and may be pre-determined before the process of generating a tool path even begins. In some embodiments, the configuration data of a node may be dependent on and received at least in part from another node in the system. However, the configuration data adheres to the same rules as the raw pass packets imposed by the directed acyclic graph nature of the nodes, i.e. that configuration data, insofar at it is received from another node in the system, may only be received from a node with a lower ordering number in the system.

The configuration data is generally editable by a user. In some embodiment, at least some of the configuration data, or other data resulting in configuration data, must be input by a user before the system can start generating a tool path. For example, such configuration data can include, but is not limited to, prioritized patterns or styles of motion, tolerance requirements, tool definitions, secondary geometry considerations such as defining an area for the tool to stay within or avoid and tilting preferences with respect to the tool.

Figure 3:
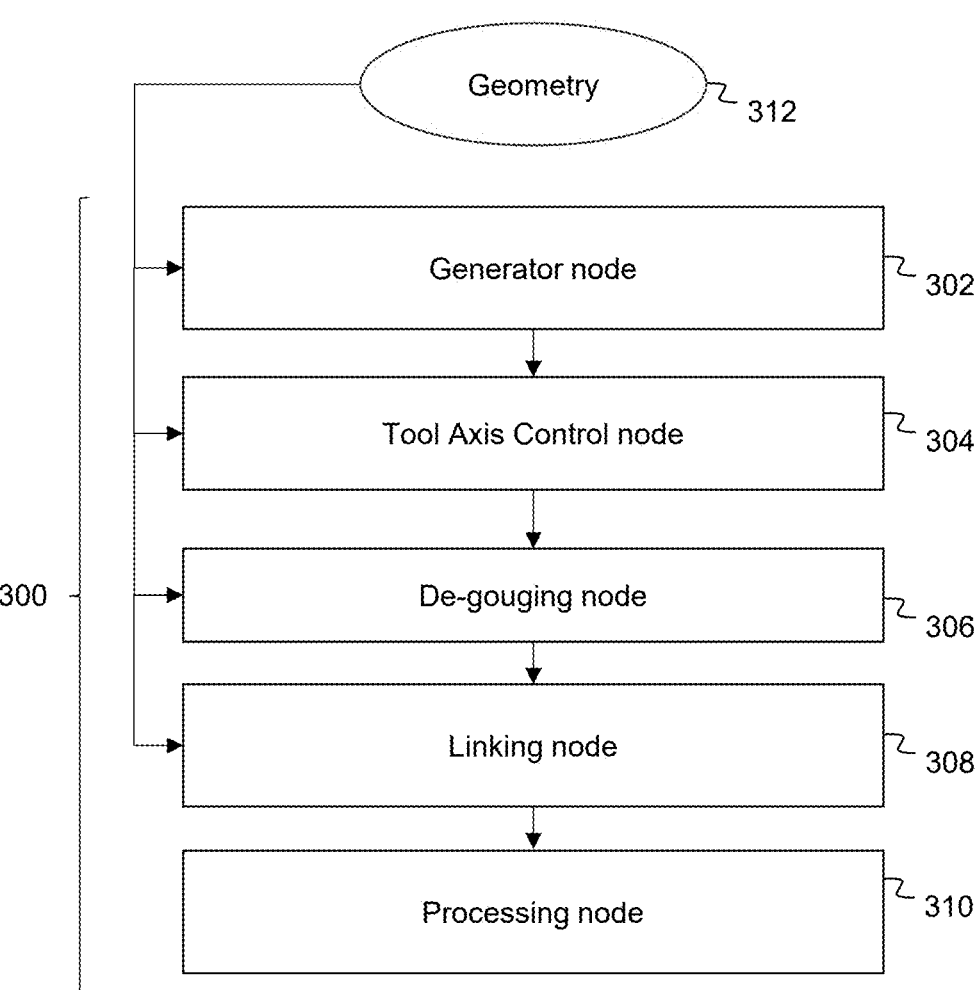
FIG. 3 schematically shows a system of nodes according to one embodiment.

Looking now at FIG. 3, another embodiment of a system 300 is shown, which is a more specific example of the system shown in FIG. 1.

The system comprises a generator node 302, a tool axis control, TAC, node 304, a de-gouging node 306, a linking node 308 and a processing node 310. Each node generates an output which is used as input for a subsequent connected node in the system. The TAC node 304, the de-gouging node 306 and the linking node 308 are all different type of filter nodes 104, as described in relation to FIG. 1. This entails that all of the nodes 304, 306, 308 require raw pass packets as both input and output data.

In a simple embodiment, the generator node 302 is the first node, which generates an output for the TAC node 304, which is the second node. The TAC node 304 uses the output from the generator node 302 and generates an output for the de-gouging node 306, which is the third node. The de-gouging node uses the output from the TAC node and generates an output for the linking node 308, which is the fourth node. The numbers used above are intended to denote a relationship between ordering numbers rather than a node being of a specific ordering number, i.e. the first node has a lower ordering number than the second node, the second node has a lower ordering number than the third node, and so on.

The function of the generator node 302 and the processing node 310 are the same as described in relation to FIG. 1.

The system may comprise any number of nodes in any order and they may be connected in any way as long as they adhere to the rules of the system.

The TAC node 304 is adapted to add tool axis control, TAC, information to the raw pass packet. The TAC information comprises a location and orientation of a tool that is to be used when manufacturing the object, a tip position of the tool in each contact point and a surface normal of the tool.

In order to add the TAC information to the tool path, information about the tool to be used is required. In some embodiments, the required information about the tool comprises a tool geometry, including a tool tip position. In some embodiments, it may also comprise additional information about the tool, such as tool material, specifics about the tool material, characteristics of the tool such as RPM, and similar information.

Typically, the TAC node 304 will not send a raw pass packet to the de-gouging node before each point contained in the raw pass packet comprises TAC information.

The de-gouging node 306 is adapted perform a de-gouging operation on the data obtained from the TAC node 304. A de-gouging operation comprises ensuring that there are no undesirable positions of the tool along any of the passes contained in the raw pass packet received from the TAC node. An undesirable position of the tool includes a collision of the tool with anything other than the workpiece material from which the object is cut, and a position in which the tool goes beyond a surface boundary of the object, i.e. that the tool would remove material that is not supposed to be removed from an inside of the object, which is also referred to as gouging. The de-gouging operation is typically performed by simulating a manufacturing process using the data obtained from the TAC node 304 and using the results of the simulation as a basis for determining if there are any undesirable positions in the raw pass packet.

If the de-gouging node 306 determines that there are undesirable positions of the tool in the raw pass packet received from the TAC node 304, the de-gouging node 306 will modify the data in the raw pass packet such that there are no longer any undesirable positions. In some embodiments, this entails that the de-gouging node 306 first modifies the data and then performs a second simulation to ensure that the modified data does not result in an undesirable position as well.

The de-gouging node 306 will generally not send a raw pass packet to the linking node 308, before the raw pass packet has been determined to not contain any undesirable positions.

The linking node 308 is adapted to provide linking information on how to transition between each end point of one pass and the starting point of the next pass. As mentioned, each pass describes a series of locations to be traversed by a tool, but not necessarily how to transition between the end of one pass to the start of the next pass, i.e. from an endpoint to the following starting point. It is generally not possible to know how such a transition should be made before the tool axis control information has been added to the raw pass packet.

The linking node 308 will generally not send a raw pass packet to the processing node 310 before the raw pass packet has been determined to contain a path for the tool between all points contained in the raw pass packet.

In some embodiments, the geometry 132 of the part to be manufactured, which may be contained in a 3D model, is used as an input for several or each of the nodes in the system. In some embodiments, different and/or slightly altered geometries of the object to be manufactured may be used as input for different nodes in the system.

By enabling using an altered version of the object as input, a more flexible system may be achieved. It may be beneficial to use versions of the object to be manufactured with slightly altered characteristics as input for certain nodes, in order to achieve specific outcomes. For example, in order to decrease the computational demands a less complex or detailed version of the object may be used in certain nodes. Another example is that a smoother version of the object might be used to generate the first raw pass packet with the generator node.

In some embodiments, the TAC node is adapted to use as input a geometry of the object to manufactured with a higher smoothness than the 3D model representing the object to be manufactured.

In some embodiments, all nodes in the system except for the de-gouging node 308 are able to use a slightly different geometry of the object to be manufactured as input. Due to the purpose of the de-gouging node being to ensure that no collisions or gouging occurs, having the model of the object be as close to reality is very important, but that is not necessarily the case for the other nodes in the system, or at least not to the same extent.

In some embodiments all nodes are configured to never start computation before all preceding connecting nodes in the system have finished their processing, which entails that any given node must have received data from any connected preceding node in the system before it begins its processing of the RPP data.

However, it may still be beneficial to enable the system to have system configurations in which only some of the preceding nodes need to have finished their processing of data before a subsequent node is able to start, while still enforcing the limitation on requiring all connected preceding nodes to have finished on a majority of the nodes in the system. For that purpose, the system may in some embodiments comprise another type of node, which is referred to as a logic node.

A logic node is usually a type of filter node, and is adapted to both input and output RPP data. However, the logic node is exempt from the limitation of requiring all connected preceding nodes to have finished their processing, in embodiments where all other types of nodes have that limitation. A logic node may also have as a purpose and function to select between multiple available subsequent nodes.

The function and usage of logic nodes will be elaborated on in relation to the description of embodiments of super-nodes, but they are not limited to being used inside of a super-node. In short, the function of a logic node may be described as turning on and off certain paths between connected nodes in the system.

In some embodiments some or each of the nodes 302, 304, 306, 308 may be a super-node containing multiple nodes arranged in sequence and/or in parallel. This will now be described further in relation to FIGS. 4-7.

In some embodiments, one or multiple nodes in the system may be super-nodes, wherein each super-node comprises a plurality of nodes. Typically, each node within each super-node must still adhere to the rules of the system, but it is possible to have different types of nodes within a super-node of a certain type. For example, a generator super-node may contain a filter node. Any of the super-nodes may contain a processing node, which may be adapted to output scoring data. In some embodiments, it may be possible for nodes within a super-node to not adhere to the same rules, as long as the super-node itself adheres to the rules.

Figure 4:
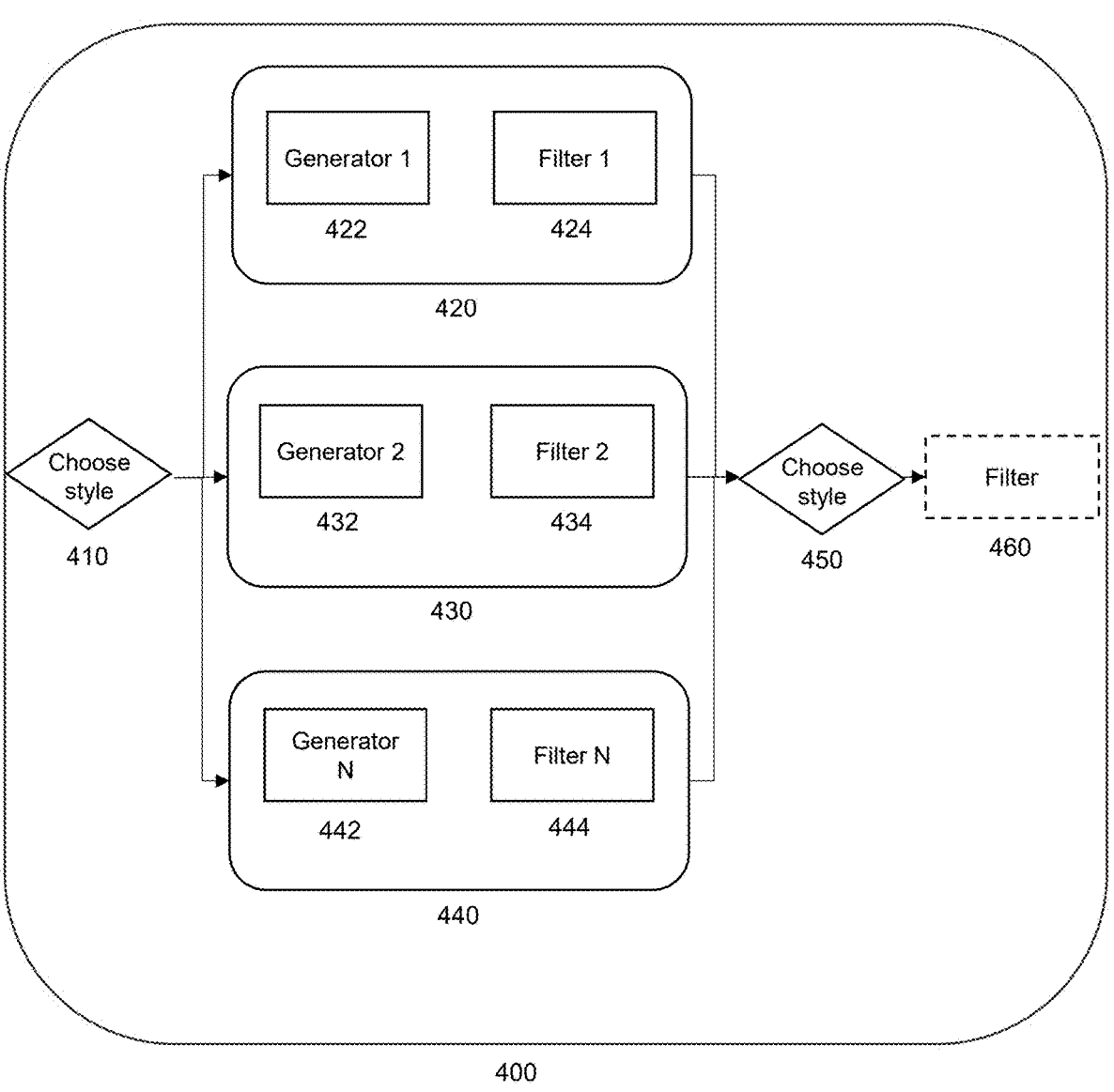
FIG. 4 schematically shows an embodiment of and a flow diagram for a generator super-node.

FIG. 4 schematically shows a flow chart representing the function and nodes of a generator super-node 400 according to some embodiments. In some embodiments, one or multiple generator nodes in a system described in this disclosure may be generator super-nodes 400. FIG. 4 shows both nodes and steps, wherein the steps may be performed in specific nodes but does not necessarily require a specific node, as will be elaborated on further.

The generator super-node 400 supports N different styles of generation, which may be N different styles of motion. The generator super-node 400 comprises a plurality of different generator nodes 420, 430, 440 denoted generator 1, generator 2 and generator N in FIG. 4. As will be understood, this is intended to represent a generator super-node which comprises N different generators, where N may be any number and is determined by the specific implementation of the system.

Before a certain generator is used in the generator super-node 400, a choice is made in order to determine which of the generators 420, 430, 440 is or are to perform their operations. This choice is represented by the choose style step 410. The choose style step 410 may in some embodiments be performed in a logic node, but is generally made by altering the configuration data of the generator super-node 400. In some embodiments, a user specified choice is required before the generator super-node starts its operation. In some embodiments, the system is adapted to automatically make a choice in case the user does not specify anything.

In some embodiments, the choose style 410 step may be performed in a logic choice node. The logic choice node is a type of logic node which is adapted to select which of multiple available subsequent nodes are to perform their operation. In some embodiments, the logic choice node in the beginning of a generator super-node is adapted to accept input which does not contain a RPP, just like a generator node. In some embodiments, a logic choice node does not need to output a RPP either, although it may be adapted to depending on the implementation. The output of a logic choice node is a selection of one or multiple connected subsequent nodes which are to perform their operation. It can be noted that, seen from outside of the generator super-node 400, the super-node 400 still adheres to the rules of the system since it is adapted to take any input, which is then going into the logic node 410, and output RPP, which is output from the logic node 450 and/or filter node 460.

In a common implementation the choice may represent a style in the form of e.g. a desired pattern of a tool path, such as a spiral tool path. The style may be chosen by a user, or it may be automatically determined by the system based on other criteria chosen by a user.

After the first step, the data is selectively routed to one or multiple of the generators 420, 430, 440 depending on which style that was chosen, and depending on which styles are supported by which generator. For example, if the chosen style was a spiral tool path, only the generators which are adapted to generate spiral tool paths are activated. In some embodiments, there may be only a single generator active for any chosen style. In other embodiments, there may be multiple generators which are activated based on the chosen style. To this end, each generator may in some embodiments be associated with different tags intended to represent and/or correspond to the possible choices of style. In some embodiments, the styles to choose from are predetermined and a user may be prompted to choose a style before the system starts generating the tool path.

In some embodiments, such as the one shown in FIG. 4, each generator node 420, 430, 440 within the generator super-node 400 may be comprised of a generator node 422, 432, 442 and a filter node 424, 434, 444. In other words, each generator node within the generator super-node may in turn contain multiple nodes as well.

The filter nodes 424, 434, 444 in the specific implementation shown in FIG. 4 may in some embodiments be a type of filter called a reordering filter, which has the purpose of optimizing the path length and/or runtime of the raw pass packet. This may be achieved by changing the position of points in the raw pass packet.

After the relevant generator(s) have been activated and performed its processing, another choose style step 450 may be needed, to select which output is to be used and/or forwarded to the subsequent node in the system, which may be a filter node 460.

The second choose style step 450 may be implemented in a logic node. The reason for having a logic node prior to forwarding to the next node in the system may be to have embodiments in which all preceding connecting nodes except logic nodes must have finished their execution. Since not all generator nodes within the generator super-node is activated, the subsequent node in the system would thus not begin its processing if it was any other type of node than a logic node in such embodiments.

The filter node 460 may be a reprojection filter node, which has the purpose of ensuring that all of the points in the RPP are located on the surface of the part to be manufactured. This may be done by using the geometry of the part as an input value and comparing the points in the RPP with that. In some embodiments, the data may be sent directly from the logic node to the next node or super-node in the system which is outside of the generator super-node structure, without passing through a filter node 460.

In some embodiments, the next node in the system may be another filter node within the generator super-node, as shown in FIG. 4 as a reprojection filter, which has the purpose of ensuring that all of the points in the RPP are located on the surface of the part to be manufactured. This may be done by using the geometry of the part as an input value and comparing the points in the RPP with that. In some embodiments, the data may be sent directly from the logic node to the next node or super-node in the system which is outside of the generator super-node structure.

Figure 5:
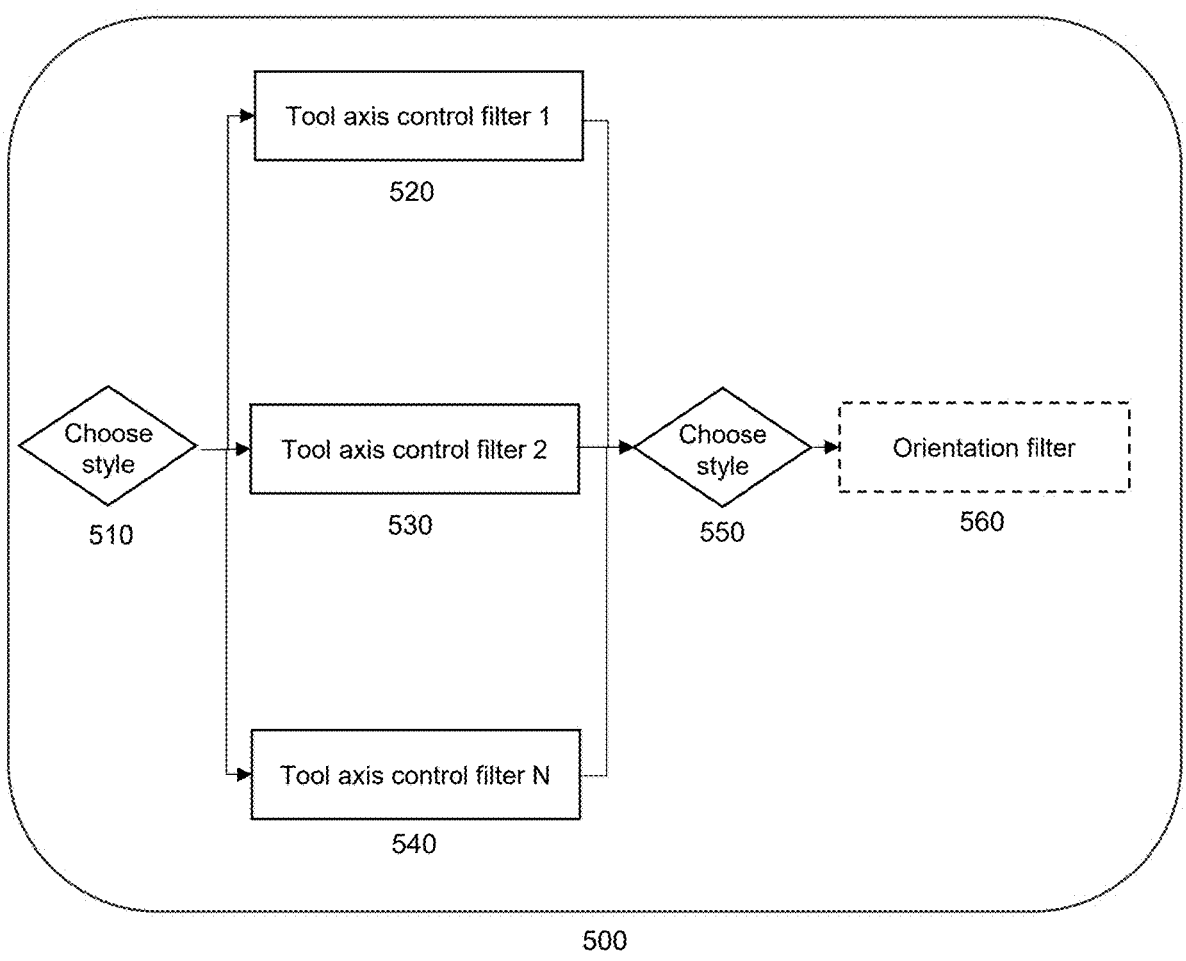
FIG. 5 schematically shows an embodiment of and a flow diagram for a tool axis control super-node.

FIG. 5 schematically shows the function, nodes and data flow of a TAC super node 500, which is a type of filter node. The input to the TAC node 500 comprises a RPP and the output of the TAC node 500 comprises a RPP.

The TAC super node comprises a first tool axis control filter 510, a second tool axis control node 520, and a N: th tool axis control node 530, as well as any number of additional nodes between the second and the N: th node depending on the implementation. N can theoretically be any number and is dependent on the amount of relevant choices in a particular tool axis control node.

In a first choose style step 510, a choice is made about which of multiple available TAC nodes 520, 530, 540 are to perform their operation.

The choose style step 510 may be implemented in a logic node, which is adapted to accept RPP as input and to transmit it to one or multiple of the available TAC nodes 520, 530, 540.

After the relevant filter(s) have been activated and performed its processing, another choose style step 550 may be needed, to select which output is to be used and/or forwarded to the subsequent node in the system, which may be a filter 560. The choose style step 550 may be implemented in a logic node.

The filter 560 may be an orientation filter, which is adapted to determine the direction of rotation of a tool relative to the feed direction of the workpiece material. In some embodiments, the data may be sent directly from the logic node 550 to the next node in the system without requiring an additional filter 560.

In some embodiments, logic nodes come in pairs, such as described in FIG. 5. A first logic node 510 may be used to direct the data to one or multiple of multiple available nodes. A second logic node 550 is then used as the destination for the data from each of the nodes which the data was directed to. The second logic node 550 may be used in order to allow the other nodes in the system to adhere to the rule of requiring all previous connected nodes to have finished their operation before beginning its operation, since it is possible that not all of the preceding connected nodes 520, 530, 540 have finished their operation if the first logic node 510 did not determine that they were to be activated.

Figure 6:
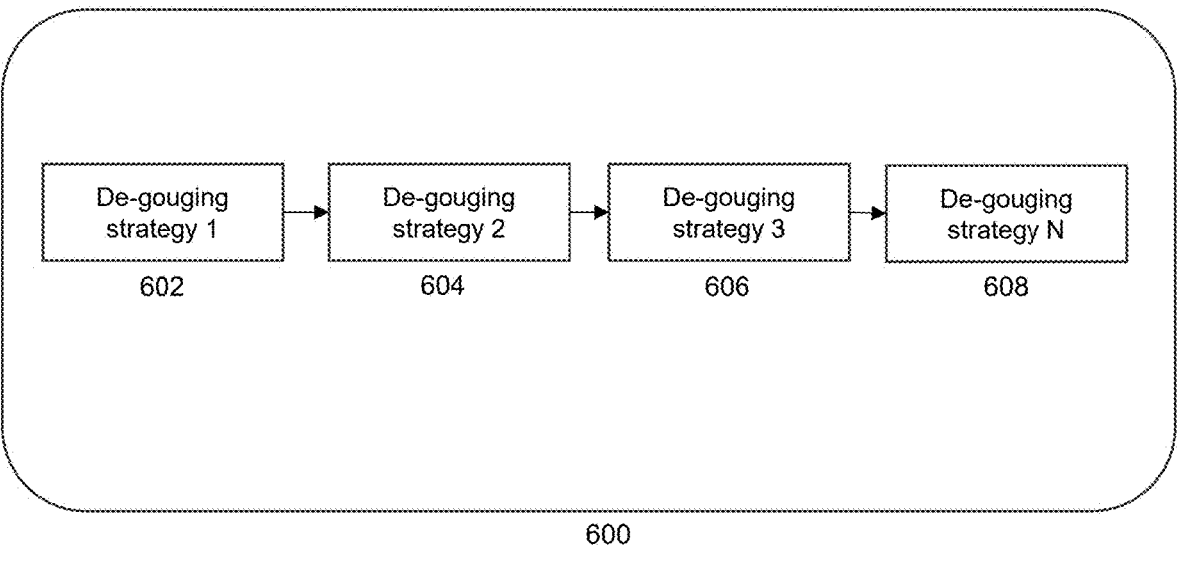
FIG. 6 schematically shows an embodiment of and a flow diagram for a de-gouging super-node.

FIG. 6 schematically shows a de-gouging super node 600. The input to the de-gouging super-node 600 comprises a RPP and the output of the de-gouging super-node 600 comprises a RPP.

The de-gouging super node 600 comprises a first de-gouging node 602 employing a first de-gouging strategy, a second de-gouging node 604 employing a second de-gouging strategy, a third de-gouging node 606, employing a third de-gouging strategy, any number of additional de-gouging nodes depending on the implementation, and a N: th de-gouging node 608 employing a N: th strategy, wherein N can be any number depending on a desired implementation. As mentioned, the purpose of a de-gouging node is to ensure that there are no undesirable positions of the tool at any point along the tool path, including collisions with other parts of the machining system or going beyond the surface boundary of the object to be manufactured.

In some embodiments, each point in the raw pass packet is associated with de-gouging identifier which indicates whether or not that point requires de-gouging. As the de-gouging super-node 600 employs its different strategies, these identifiers are changed and when there are no points in the RPP containing an identifier denoting that de-gouging is required, the de-gouging super-node is finished and the RPP can be passed on to the subsequent node in the system.

The de-gouging super node 600 shown in FIG. 6 is structured such that the de-gouging strategies are employed in sequence. For example, a first de-gouging strategy may entail tilting the tool, a second de-gouging strategy may entail rotating the tool, a third de-gouging strategy may entail changing the order in which points in the RPP are ordered and thus contacted by the tool. Other relevant de-gouging strategies may include tilting, lifting, trimming away points or passes, repositioning points or passes.

Typically, the first de-gouging strategy is the one requiring the least amount changes overall. This may entail the least amount of and/or the least complicated type of movement of the tool, and/or the least amount of changes to the points in the RPP. In combination with the identifiers this results in method in which the more complex strategies are not employed unless necessary, which results in a faster and more efficient system.

The de-gouging node 600 requires knowledge about the tool or tools to be used in order to perform its function, since the purpose of the node is to ensure that there are no undesirable positions of the tool. It also requires knowledge about the geometry of the object. In some embodiments, the de-gouging node 600 also requires additional information about the physical layout of the machining system, including e.g. the position of fixtures, tables, and other machines.

Figure 7:
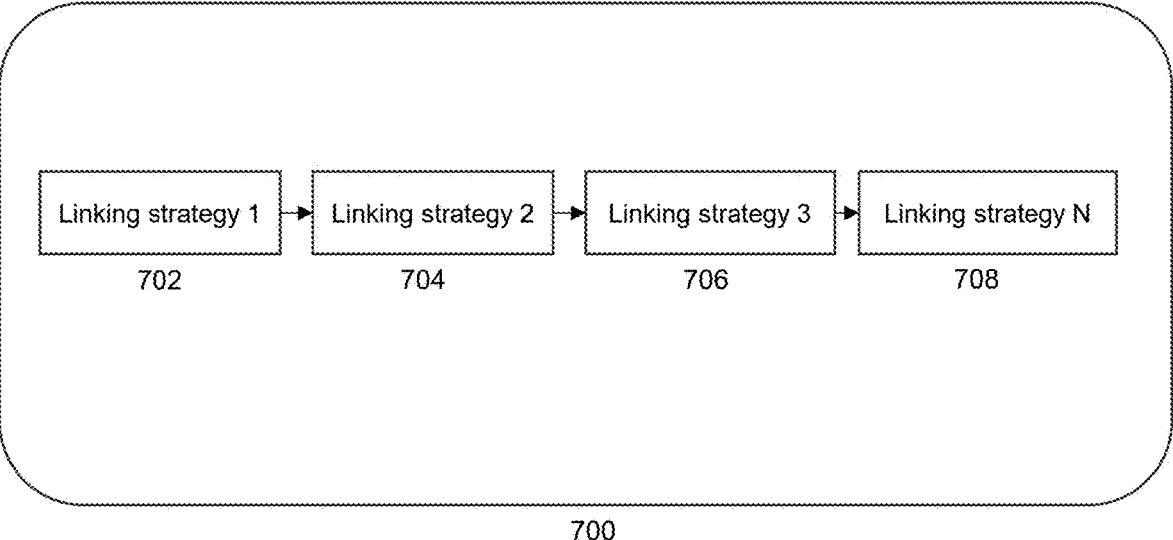
FIG. 7 schematically shows an embodiment of and a flow diagram for a linking super-node.

FIG. 7 shows a linking super-node 700. The input to the linking super-node 700 comprises a RPP and the output of the linking-node 700 comprises a RPP.

The linking super-node 700 comprises a first linking node 702 employing a first linking strategy, a second linking node 704 employing a second linking strategy, any number of additional linking nodes depending on the implementation, and a Q: th linking node 706 employing a Q: th strategy, wherein Q can be any number depending on a desired implementation.

The linking super-node 700 employs strategies sequentially in a similar manner to the de-gouging super-node 600, for similar reasons. In some embodiments, the RPP further comprises information indicating which points are end points of a pass and the starting point of the next pass, as well as information indicating whether or not there is a linking between those points. By using such information, the linking super-node knows where to try to employ a linking strategy, and a subsequent linking strategy only needs to be employed for end points and their corresponding starting points which were not able to be linked by previous linking strategies.

All nodes in the system described herein are restricted to require predefined types of data as input and/or output. In some embodiments, this may entail that no other data than the specifically required data is allowed as input and/or output for a node. In some embodiments, the required data, i.e. at least the raw pass packet, must be received together with and/or at the same time as any additional data in order for the additional data to be accepted. In some embodiments, the required data and additional data may be sent at separate times, as long as the required data is present when the node beings its operation.

In some embodiments, subsequent nodes of the system are generated as the system operates, and will start being generated after the first generator node has started its operation. Such embodiments enable a dynamic system which can be adapted based on user preferences and/or on the specific details of a given work order.

Throughout this disclosure, there are various types of restrictions mentioned in various types of embodiments, including the requirement of RPP as either input, output, or both, that a node must wait for all earlier nodes to finish their processing before starting its own processing, which configuration data is required, etc. In general, all those these types of restrictions are freely combinable, unless contradictory. In some embodiments, some restrictions that are common for all nodes. In some embodiments, the data restrictions are the same for all involved nodes. In some embodiments, the data restrictions are the same for all nodes of the same type, but can differ between different types of nodes.

In some embodiments, any or each node in the system may be connected to a node which can convert the raw pass packet into scoring data which can be analyzed in order to determine various properties of the data. Based on such analysis, the decisions may be made such as discarding the data, forwarding the data to the next node, determining a path for the data when there are multiple paths available, etc.

In some embodiments, the generator node(s) 102, 400 of a system according to the present disclosure are adapted to only perform the functions described herein, and no other functions. Any of the functions described in relation to different embodiments may be performed, and any combination of the functions described may be performed.

In some embodiments, the filter node(s) 104, 500, 600, 700 of a system according to the present disclosure are adapted to only perform the functions described herein, and no other functions. Any, all, or some of the functions described in relation to different embodiments may be performed for any given filter node in the system, and any combination of the functions described may be performed.

In some embodiments, the processing node(s) 106 of a system according to the present disclosure are adapted to only perform the functions described above, and no other functions. Any of the functions described in relation to different embodiments may be performed, and any combination of the functions described may be performed.

In some embodiments, the system only comprises nodes of the types described herein and no other types of nodes. In some embodiments, the system only comprises generator nodes, filter nodes and processing nodes. In some embodiments, the only types of filter nodes are TAC nodes, de-gouging nodes and linking nodes.

Figure 8:
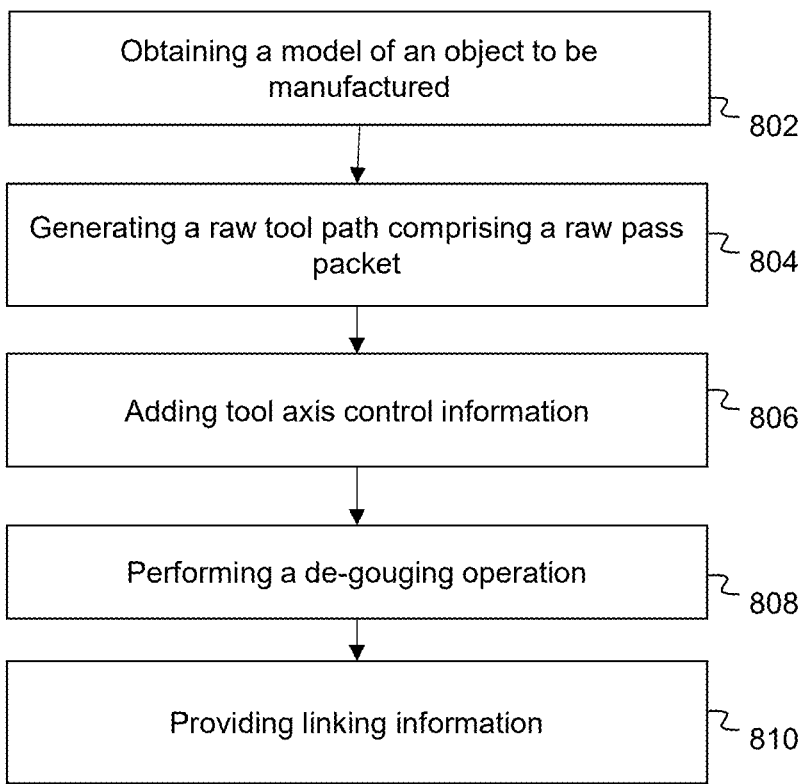
FIG. 8 schematically shows steps of a method according to an embodiment.

Looking now at FIG. 8, the steps of a method 100 according to the present disclosure will be described more in detail. The method may be performed in a system as disclosed herein.

The method comprises obtaining 802 a model of an object to be manufactured. The model is a 3D model of an object, such as a CAD model. The obtaining step may in some embodiments comprise automatically generating a model based on an input, such as an image or a photo of an object. The model of the object comprises the geometry of the object, including the surface boundary of the object.

In some embodiments, the method is intended to be performed as a finishing tool path and the workpiece material to be used as a basis for the manufacturing is a nearly finished version of the object.

In some embodiments, obtaining 802 the model also comprises obtaining a model of the workpiece material from which the object is to be machined.

The method further comprises generating 804 a raw tool path comprising a raw pass packet, based on the model of the object. The generating step 104 may in some embodiments be performed by a generator node according to the present disclosure.

By generating 804 a raw tool path comprising a raw pass packet first without taking any tool information into account, the generating 104 step can be performed quickly in relation to methods which take the tool into account, and it can also be edited more quickly.

The generating 804 may in some embodiments comprise using a pre-determine pattern as basis for the raw tool path. The pre-determined pattern may be dependent on a pre-selected user preference regarding a pattern type. In some embodiments, the pattern is chosen automatically based on the model of the object to be manufactured. Examples of different types of pattern may be for example, spiral tool paths, planar slices, raster, constant stepover, morphed or blended stepover, as well as user defined patterns.

The generating 804 may in some embodiments be performed with certain pre-defined constraints, which may be user-selected constraints. Some examples of constraints that may be used in the generating include one or more of: maximum distance between contact points, minimum distance between contact points, desired distance between contact points, spacing between adjacent cuts and curvature constraints. In some embodiments, the maximum distance between contact points may be up to 5 cm, and the minimum distance between contact points may be 1 mm.

The method then comprises adding 806 TAC Information, to the raw tool path. The step of adding 806 TAC information may in some embodiments performed by a TAC node, according to embodiments of the system of the present disclosure.

The TAC information comprises a location and orientation of a tool that is to be used when manufacturing the object, a tip position of the tool in each contact point and a surface normal for each contact point. After the TAC information has been added to the raw tool path, offset cutter location data is obtained. The offset cutter location data describes not only which locations that are to be traversed, but also the location and orientation of a tool which is to be used, which in combination results in describing how the tool should move in order to machine the object from the workpiece material.

In order to add the TAC information to the tool path, information about the tool to be used is required. In some embodiments, the required information about the tool comprises a tool geometry, including a tool tip position. In some embodiments, it may also comprise information about preferences for tool axis alignment, which may be based on e.g. user preferences or on the machining system. In some embodiments, the model of the object obtained in step 802 is also used as input for the adding step 806, since all of that information is not necessarily retained in the RPP.

The method further comprises performing 808 a de-gouging operation on the OCLD. The de-gouging step 808 may in some embodiments be performed by a de-gouging node of a system of the present disclosure.

The de-gouging operation comprises ensuring that there are no undesirable positions of the tool along the entire path outlaid by the offset cutter location data. An undesirable position of the tool includes a collision of the tool with anything other than the workpiece material from which the object is cut, or a position in which the tool goes beyond a surface boundary of the object, i.e. that the tool would remove material that is not supposed to be removed from an inside of the object.

In some embodiments, the model and/or geometry of the object obtained in step 802 is also used as input for the de-gouging step 808. In some embodiments, the model and/or geometry of the object can also be part of the offset cutter location data, but it does not have to be.

In some embodiments, the de-gouging 808 may be performed using another model as input than the one obtained in step 802. This may enable the method to perform the de-gouging relative to another geometry, which may be especially relevant if the geometry that was used in previous steps was an altered version of the object to be manufactured. De-gouging 808 compared to a different model than the model of the object used for generating the tool path may be beneficial in order to e.g. save the computing power needed to generate the tool path by using a less detailed version of the object, but still making sure that a more detailed version is used such that no undesirable collisions occur.

In some embodiments, the de-gouging step 808 may improve the machine and/or tool motion by taking movement queues from a smoother representation and then de-gouging against the more detailed original model.

If it is determined that the offset cutter location data would result in undesirable positions, the de-gouging 808 may comprise changing the offset cutter location data. Changing the offset cutter location data may comprise changing one or multiple positions, and/or changing the tool tip position and/or the tool orientation in one or multiple positions. In some embodiments, the de-gouging may comprise changing other variables as well that affect the tool tip position.

In some embodiments, the de-gouging is performed by simulating a manufacturing using the offset cutter location data and detecting if and where undesirable positions of the tool are located. Wherever such undesirable positions are detected, the method comprises adjusting the offset cutter location data in order to avoid such undesirable positions. Such adjustment may involve any adjustment described in relation to the de-gouging node.

The method further comprises providing 810 linking information on how to transition between each end point of one pass and the starting point of the next pass. As mentioned, each pass describes a series of locations to be traversed on the object, but not how to transition between the end of one pass to the start of the next pass, i.e. from an endpoint to the following starting point. It is not possible to know how such a transition should be made before the tool axis control information has been added and the de-gouging operation has been performed. Then, after the linking information has been added, a complete tool path is obtained, containing all relevant information to be run on a CNC machine in order to machine the desired object.

In some embodiments, the method may comprise a second de-gouging step after the linking information has been provided, since there is a possibility of undesirable tool positions in the transition between the end point of one pass and the starting point of the next.

In some embodiments, the method comprises performing the steps in exactly the order described without any overlap between what is performed in which step.

In some embodiments, the method is performed such that the data obtained in each step consists of only the data described and nothing else. Thus, in some embodiments, after the first step of generating 804 a raw tool path, there is no other information then a plurality of passes, each comprising a plurality of contact points.

After the step of adding 806 tool axis control information, the data comprises the plurality of passes from step 804, as well as tool axis control information for each contact point.

After the de-gouging 808 step, the data consists of the same type of data as after the adding step 808, but wherein specifics of the data may have been changed, more precisely wherein the contact positions and/or of the tool axis control information may have been changed.

After the linking step 810, the data consists of the same contact positions and tool axis control information as after the de-gouging step 108, but with additional information detailing how the tool should move from the end of one pass and to the start of the next pass.

As will be understood, in case machining an object comprises using multiple different CNC machines, the generated tool path may in some embodiments only describe part of the required information for achieving the final object. Since several steps are dependent on the tool used for the machining, at least these steps need to be performed once for each tool used, before a complete tool path can be obtained.

According to another aspect, a method for generating a system of nodes as disclosed herein is also provided. The method for generating nodes comprises a first step of generating a first node, which may be any of the types disclosed herein. In some embodiments, the method may be performed in order to adapt a system and add additional nodes, and therefore the first node generated by such a method does not need to be a generator node. However, in case the method is used for generating a system from scratch, the first step generally comprises generating a generator node.

The method then comprises a second step of generating a second node, which may also be any of the types disclosed herein, connected to the first node. The step of generating a second node may in some embodiments be performed based on the first node already performing part or all of its function, such that a system of nodes may be constructed at runtime based on output data generated from previous nodes in the system.

The method may then comprise a third step of generating a third node, which is connected to at least one of the first and second previously generated nodes. The third step may in some embodiments only be performed after the second generated node has performed its functions.

In some embodiments, one or multiple of the node generation steps may comprise generating multiple nodes at the same time.

In some embodiments, one or multiple node generation steps may be performed based on scoring data output from a system of nodes according to the first aspect. In other words, a first system of nodes may be used primarily for generating scoring data intended to inform and optimize the generation of a second system of nodes. The second system of nodes may be used in a similar fashion, i.e. to generate scoring data which is used as basis for generating a third system of nodes.

In some embodiments, a system of nodes may be adapted to both output a tool path which is used to manufacture an object, and scoring data which is used as input in a method for generating another system of nodes.

In this way, an adaptive system of nodes may be achieved which is self-improving based on data output by previous iterations of a similar system.

The system of nodes described herein may be implemented in digital electronic circuitry, or in computer software, firmware or hardware, including the structures disclosed herein and their structural equivalents, or in any combination of one or more of them.

The systems and/or methods disclosed herein may be implemented on a device comprising processing circuitry and a memory. The processing circuitry may comprise one or more programmable processor, application-specific integrated circuits, field programmable gate arrays or combinations of these adapted to execute instructions. The memory may contain instructions executable by said processing circuitry, whereby the device is operative for performing any of the method steps described herein.

The device that performs the method may be a group of devices, wherein functionality for performing the method are spread out over different physical, or virtual, devices of the system. In other words, the device may be a cloud-solution, i.e. the device may be deployed as cloud computing resources that may be distributed in the system.

According to other embodiments, the device may further comprise a communication unit, which may be considered to comprise conventional means for communicating with other devices. For example, the device may be adapted to communicate with a machining system comprising machine tools.

The instructions executable by said processing circuitry may be arranged as a computer program stored e.g. in the memory. The processing circuitry and the memory may be arranged in a sub-arrangement. The sub-arrangement may be a micro-processor and adequate software and storage therefore, a Programmable Logic Device, PLD, or other electronic component(s)/processing circuit(s) configured to perform the methods mentioned above.

The computer program may comprise computer readable code means, which when run causes a device and/or system to perform the method steps described in any of the described embodiments herein. The computer program may be carried by a computer program product connectable to the processing circuitry. The computer program product may be the memory. The memory may be realized as for example a RAM (Random-access memory), ROM (Read-Only Memory) or an EEPROM (Electrical Erasable Programmable ROM). Further, the computer program may be carried by a separate computer-readable medium, such as a CD, DVD or flash memory, from which the program could be downloaded into the memory. Alternatively, the computer program may be stored on a server or any other entity connected to the relevant device or system, or to which the relevant device or system has access via the communication unit. The computer program may then be downloaded from the server into the memory of the device.

Although the description above contains a plurality of specificities, these should not be construed as limiting the scope of the concept described herein but as merely providing illustrations of some exemplifying embodiments of the described concept. It will be appreciated that the scope of the presently described concept fully encompasses other embodiments which may become obvious to those skilled in the art, and that the scope of the presently described concept is accordingly not to be limited. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for an apparatus or method to address each and every problem sought to be solved by the presently described concept, for it to be encompassed hereby. In the exemplary figures, a broken line generally signifies that the feature within the broken line is optional.

The invention claimed is:

1. A system of nodes for generating machine executable instructions representing a tool path to be used by a tool of a machine in order to manufacture an object from a workpiece material, the system comprising:

a generator node, adapted to generate and transmit a raw pass packet, the raw pass packet comprising a plurality of passes, each pass comprising a plurality of points, each point detailing a location in space to be traversed by a tool in order to manufacture an object from a workpiece material;

a filter node, adapted to receive, modify and transmit the raw pass packet, wherein the system includes two different types of filter nodes:

a de-gouging node, which is a type of filter node adapted to perform a de-gouging operation on the raw pass packet, wherein the de-gouging operation ensures that there are no collisions of the tool with anything other than the workpiece material from which the object is cut, and that there is no position in which the tool goes beyond a surface boundary of the object, for each point in the raw pass packet; and a linking node, which is a type of filter node adapted to add linking information to the raw pass packet, the linking information describing how to transition between an end point of one pass and the starting point of the next pass, for all passes in the raw pass packet except for the last pass; and a processing node, adapted to receive the raw pass packet and convert it to machine executable instructions for controlling the tool, wherein the nodes are arranged as a directed acyclic graph, such that each node is associated with an ordering number and wherein each node can only transmit data to a node with a higher ordering number and only receive data from a node with a lower ordering number.

2. The system according to claim 1, wherein each node further comprises configuration data detailing the function of the corresponding node, and wherein each node is configured to receive configuration data from another node in the system with a lower ordering number.

3. The system according to claim 1, wherein the system only comprises generator nodes, filter nodes, and processing nodes.

4. The system according to claim 1, comprising a third type of filter node called a tool axis control node, which is a type of filter node adapted to add tool axis control information to the raw pass packet, wherein the tool axis control information comprises a location and orientation of a tool that is to be used when manufacturing the object, a tip position of the tool in each point of each pass, and a surface normal for each point of each pass.

5. The system according to claim 4, wherein each node is adapted to only perform its specified function and no other operations.

6. The system of nodes according to claim 4, wherein each type of node except for the de-gouging node is adapted to use an altered version of the geometry of the object as input.

7. The system according to claim 1, wherein at least one of the nodes is a super node comprising multiple nodes.

8. The system according to claim 1, wherein each node is adapted to only begin its operation after all directly preceding nodes have finished their operation.

9. The system according to claim 8, further comprising a logic node, wherein the logic node is a filter node but which is exempt from the requirement to wait for all nodes with a lower ordering number to finish their operation before it starts its operation.

10. A method for generating machine instructions representing a tool path to be used by a tool of a machine in order to manufacture an object from a workpiece material, comprising the steps of:

obtaining a model of the object to be manufactured;

generating a raw tool path comprising a raw pass packet, the raw pass packet comprising a plurality of passes, each pass comprising a plurality of points, each point detailing a location in space to be traversed by a tool in order to manufacture an object from a workpiece material;

adding tool axis control information to the raw pass packet, the tool axis control information comprising, for each point in the raw tool path, a surface normal, a tip position of the tool and an orientation of the tool, thus obtaining Offset Cutter Location Data;

performing a de-gouging operation on the Offset Cutter Location Data in order to ensure that there are no collisions of the tool with anything other than the workpiece material from which the object is cut, and that there is no position in which the tool goes beyond a surface boundary of the object, for each point in the raw pass packet, thus obtaining a Safe Offset Cutter Location Data; and providing linking information about how to transition between start points and end points of each pass except for the last pass of the Safe Offset Cutter Location Data, thus obtaining a tool path.

11. The method according to claim 10, further comprising machining the object based on the tool path.

12. The method according to claim 10, wherein the steps of the method are performed in order and without overlap.

13. A computer program comprising computer readable code means to be run in a device comprising processing circuitry and a memory, which computer readable code means when run in the device causes the device to perform the following steps:

obtaining a model of the object to be manufactured;

generating a raw pass packet comprising a plurality of passes, each pass comprising a plurality of points, each point detailing a location in space to be traversed by a tool in order to manufacture an object from a workpiece material;

adding tool axis control information to the raw pass packet, the tool axis control information comprising, for each point in the raw tool path, a surface normal, a tip position of the tool and an orientation of the tool, thus obtaining Offset Cutter Location Data;

performing a de-gouging operation on the Offset Cutter Location Data in order to ensure that there are no collisions of the tool with anything other than the workpiece material from which the object is cut, and that there is no position in which the tool goes beyond a surface boundary of the object, for each point in the raw pass packet, thus obtaining a Safe Offset Cutter Location Data; and providing linking information about how to transition between start points and end points of each pass except for the last pass of the Safe Offset Cutter Location Data, thus obtaining a tool path.

14. A carrier containing the computer program according to claim 13, wherein the carrier is one of an electronic signal, optical signal, radio signal or computer readable storage medium.

\* \* \* \* \*